United States Patent [19]
Kinsman et al.

[11] Patent Number: 5,814,784
[45] Date of Patent: Sep. 29, 1998

[54] LASER-WELDING TECHNIQUES USING PRE-HEATED TOOL AND ENLARGED BEAM

[75] Inventors: Kenneth Grant Kinsman; Walter W. Duley, both of Waterloo, Canada

[73] Assignee: Powerlasers Ltd., Waterloo, Canada

[21] Appl. No.: 381,200

[22] Filed: Jan. 31, 1995

Related U.S. Application Data

[63] Continuation-in-part of Ser. No. 4,127, Jan. 13, 1993.

[30] Foreign Application Priority Data

Jan. 13, 1992 [GB] United Kingdom .................. 9200622
Feb. 2, 1994 [GB] United Kingdom .................. 9401998

[51] Int. Cl.$^6$ .................................................. B23K 26/00
[52] U.S. Cl. ................................ 219/121.6; 219/121.63; 219/121.64
[58] Field of Search ........................ 219/121.6, 121.63, 219/121.64, 121.83, 227; 606/27, 28

[56] References Cited

U.S. PATENT DOCUMENTS

| | | | |
|---|---|---|---|
| 3,467,098 | 9/1969 | Ayres ....................................... | 128/303 |
| 4,304,978 | 12/1981 | Saunders .............................. | 219/121.6 |
| 4,435,635 | 3/1984 | Parker ..................................... | 219/227 |
| 4,459,458 | 7/1984 | Vetsch et al. ......................... | 219/121.6 |
| 4,560,100 | 12/1985 | Hall ......................................... | 228/40 |
| 4,646,737 | 3/1987 | Hussein et al. ...................... | 219/121.83 |
| 4,785,156 | 11/1988 | Benko et al. ......................... | 219/121.64 |
| 4,840,304 | 6/1989 | Sato et al. ............................ | 219/121.64 |
| 4,894,509 | 1/1990 | Chalco et al. ........................ | 219/121.6 |
| 5,142,119 | 8/1992 | Hillman et al. ..................... | 219/121.64 |
| 5,194,710 | 3/1993 | McDaniel et al. ................. | 219/121.63 |
| 5,495,089 | 2/1996 | Freedman et al. ................. | 219/121.64 |

FOREIGN PATENT DOCUMENTS 0373345 6/1990 European Pat. Off. .
4017286 12/1991 Germany .

OTHER PUBLICATIONS

IBM Technical Disclosure Bulletin, Vo. 33, No. 5, Oct. 1990, pp. 122–123.

Primary Examiner—Geoffrey S. Evans
Attorney, Agent, or Firm—Fried, Frank, Harris, Shriver & Jacobson

[57] ABSTRACT

A laser processing method establishes initial coupling between the laser beam and workpiece by irradiating an intermediate tool positioned adjacent the workpiece. The tool is more absorptive at the laser wavelength than the workpiece so that the efficiency of energy transfer is increased. Subsequent processing is performed by relative movement between the workpiece and beam, either independently of the tool or in conjunction with the tool. During further processing, the beam diameter is increased to be greater than the thickness of the workpiece to enhance the further processing.

21 Claims, 7 Drawing Sheets

LASER-WELDING TECHNIQUES USING PRE-HEATED TOOL AND ENLARGED BEAM

This application is a continuation-in-part of application Ser. No. 08/004,127 filed on Jan. 13, 1993.

The present invention relates in general to laser processing techniques and more particularly to the use of laser radiation for joining, parting, heat treating or thermally modifying materials.

Laser processing of a material such as a metal conventionally involves the use of laser radiation to heat the surface to temperatures at which some physical, chemical or metallurgical change takes place. Laser radiation impinges on the surface of the material and some fraction of the total incident laser power is absorbed and converted to heat. The size of the localized area over which this heating is produced is controlled by some external means such as by focusing the laser beam with a lens or mirror.

Laser radiation has the property that it can be focused to a spot size that may be as small as one laser wavelength in diameter. This yields a high intensity of radiation within the focal area. While a spot diameter as small as a wavelength may be required for certain micromachining and cutting operations, laser processing applications such as welding and heat treating require much larger beam diameters. For example, the optimal laser beam diameter for welding with $CO_2$ laser radiation may be as large as 100–500 $\mu$m. For heat treating, a cylindrical beam profile is often desirable. This may require a complex optical system to shape the laser beam.

Applications of lasers to drilling, cutting, welding and surface heat treatment are now well known. However, the efficiency with which laser radiation couples to the material during processing depends upon the state of the surface and the physical nature of the material. When the processing laser emits in the infrared such as for the $CO_2$, Nd:YAG or Nd:glass lasers, metal surfaces in particular are generally highly reflecting in so that only a fraction of incident radiation is initially absorbed and converted to heat. Thus metals such as copper, aluminum and silver are difficult to process with infrared lasers which are the commonly available lasers with sufficient power to perform the process.

The degree of coupling of incident laser radiation to metals can be influenced by the deposition or creation of surface coatings or layers of oxides, graphite or carbides which are strong absorbers at the infrared laser wavelengths. These coatings act to increase the fraction of incident laser radiation absorbed by the surface and to transfer the heat generated in this coating to the metal underneath.

Surface roughening, either by a chemical etching technique, by mechanical means or by means of exposure of the metal surface to high intensity laser radiation having a wavelength which is more strongly absorbed by the metal, can also be used to prepare a metal surface for laser processing with an infrared laser. However, the application of such coatings is time-consuming and the resulting efficiency of the process is dependent upon the quality of the application procedure. Furthermore, mixing of coating materials with the metal may lead to deleterious physical, chemical or metallurgical effects in the laser processed surface. When the surface treatment is applied by laser, this may require a separate laser device and/or beam focusing system in addition to the laser used for laser processing of the treated part.

Overall, the effect of laser radiation is to produce a specific temperature distribution over a defined area of the metal surface for the time interval required to generate the desired physical, chemical or metallurgical change in the metal. Due to the difficulty in coupling the beam to the metals to be processed the efficiency of energy transfer is low. Accordingly, it is normal to reduce the diameter of the beam to a minimum to increase the energy absorption in a highly localized area. However, the thermal conductivity of most metals is such that the energy absorbed is disseminated relatively quickly so that coupling of the beam is still less than optimum.

In laser welding, the conventional approach is to increase the incident intensity of the laser beam until a deep penetration or "keyhole" has been achieved. However, major faults such as cracks, undercuts, inclusions, inadequate penetration, pores, evaporation of alloying elements and lack of beam coupling can occur from such techniques, rendering such a process unsuitable for widespread use.

It is therefore an object of the present invention to obviate or mitigate these disadvantages.

According to one aspect of the present invention, initial coupling of the laser beam is facilitated by an ancillary system which acts to absorb efficiently laser radiation and then to transfer the energy absorbed from the laser beam to the metal surface of a workpiece over a localized area by means of secondary thermal radiation or by physical contact.

In a preferred embodiment, this ancillary system consists of a tool which is shaped or coated so as to absorb efficiently laser radiation and positioned to transfer energy to the workpiece. The mass of this tool and its absorption characteristics is such that it can achieve the desired temperature over the time available on being exposed to incident laser radiation. The tool may be thermally insulated from its surroundings to enhance the temperature elevation.

Upon achieving the desired temperature, the tool may be positioned adjacent to or is caused to contact the workpiece over a localized area. The effect of this is such as to produce the required physical, chemical or metallurgical changes in the surface of the material. After the desired effect is produced, the tool may be withdrawn from contact with the metal surface.

In some applications, it may be advantageous to bring the laser heated tool only close enough to the metal surface so as to produce the desired physical, chemical or metallurgical effect by radiative heating. In such a case, the tool would not physically contact the surface.

The shape of the tool may be chosen so as to cause heating over a defined area on the metal surface which has the shape of the tool. This can be in the form of a complex shape and can be unrelated to the intensity profile of the laser beam used to heat the tool.

Using micromachining or forming techniques, the area of the laser heated tool that is brought into contact with the metal surface can be larger or smaller than $\lambda^2$ where $\lambda$ is the laser wavelength. As a result, energy from a laser oscillating at a wavelength $\lambda$ may be efficiently coupled into a metal surface over an area that is smaller than the diffraction limit at that wavelength.

Once coupling has been established, the laser beam is caused to move along the workpiece to perform the desired process. This may be accomplished through relative movement between the tool and the workpiece or may be accomplished by direct impingement of the laser beam with the workpiece. In the latter case, where welding is to be performed, it has been found beneficial that the laser beam has a spot diameter on the workpiece equal to or greater than the thickness of the workpiece to be welded.

As a further aspect of the invention, therefore, there is provided a method of welding using an incident laser beam in which the spot size of the incident beam is enlarged to dimensions equal to or greater than the thickness of the component being joined, such that the thermal boundary conditions of the process are modified. This geometric relationship between laser spot size and the material to be welded influences the processing event as thermal waves reflect from the rear surface creating a larger more stable weld zone.

Embodiments of the present invention will now be described by way of example only, with reference to the accompanying drawings, in which.

In each of the embodiments shown, the laser processing is performed as a welding operation but it will be appreciated that other processing such as cutting, heat treatment, surface preparation, drilling or the like, may be accomplished in a similar manner.

Figure 1:
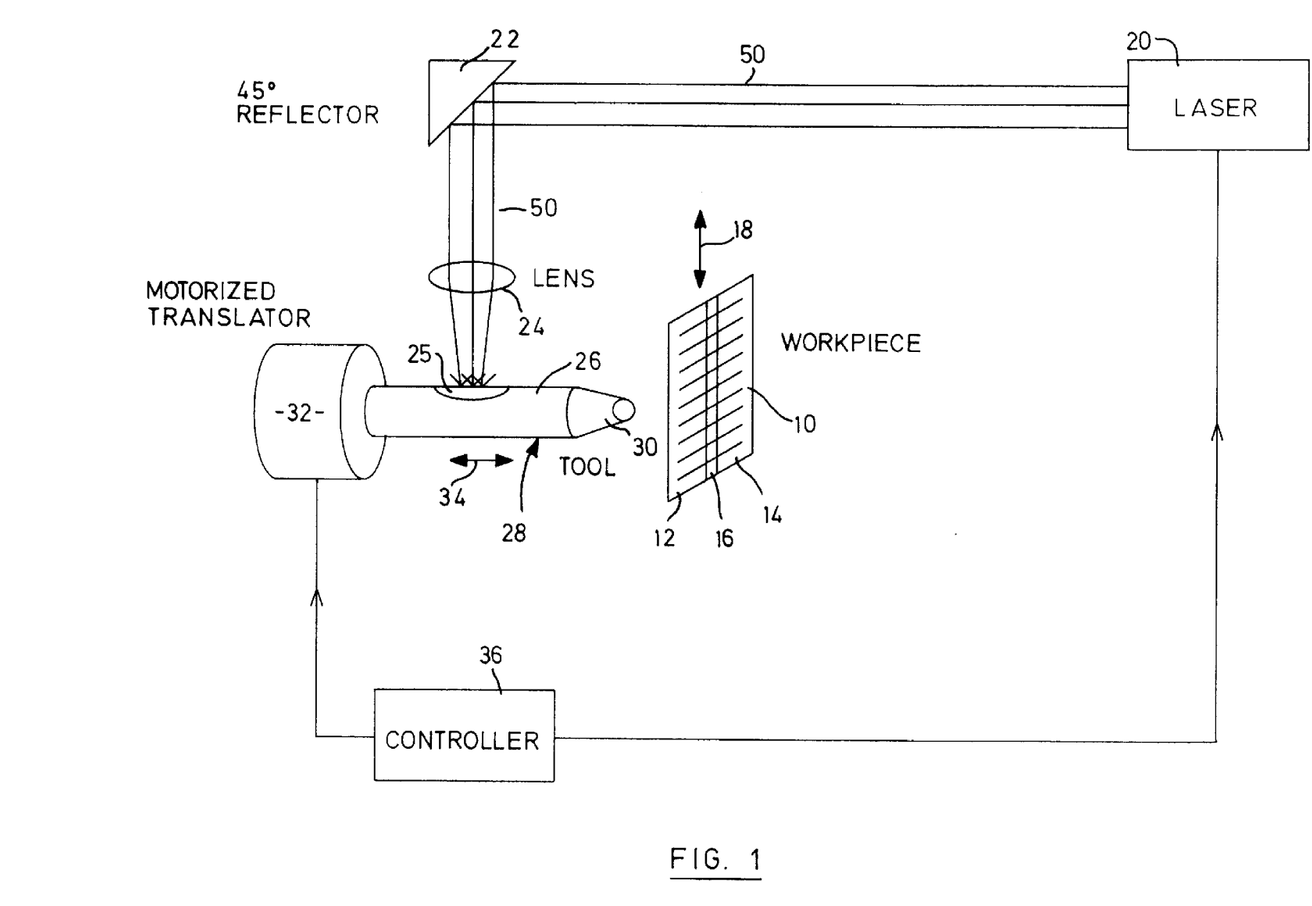
FIG. 1 is a schematic representation of an apparatus to perform a laser machining operation upon a workpiece.

Referring therefore to FIG. 1, a workpiece 10 includes a pair of components 12,14 that are to be welded to one another along a seam 16 defined between abutting edges. The workpiece 10 is mounted on a carriage (not shown) so as to be movable along an axis 18.

Energy is supplied from a laser unit 20, typically a $CO_2$ or Nd:YAG lasing unit, through a reflector 22 and lens 24 to impinge upon an absorption zone 25 of a barrel 26 of a tool 28. The tool 28 has a tip 30 directed toward seam 16 and is mounted in a support 32. Support 32 includes a translation device to adjust the position of the tool 28 along its longitudinal axis indicated at 34. The translation device and laser unit 20 are controlled by a controlling unit 36.

Figure 2:
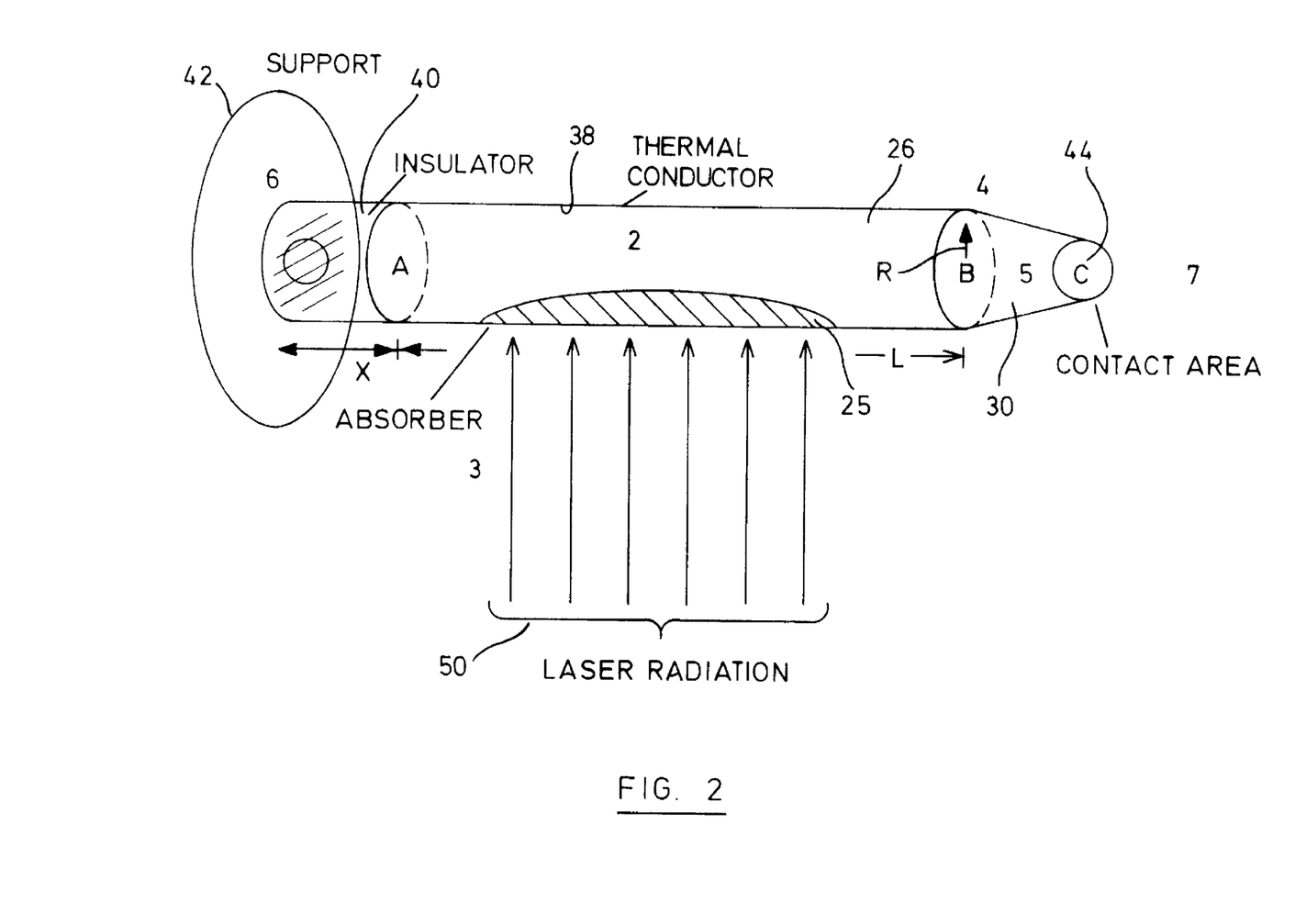
FIG. 2 is an enlarged view of a tool shown in FIG. 1.

As shown in greater detail in FIG. 2, barrel 26 has an outer surface 38 with at least the absorption zone 25 being of a material that either inherently absorbs strongly the laser radiation or that is treated or machined in such a way as to absorb strongly the incident laser radiation. The tool 28 should, of course, have a higher melting temperature than the material to be processed and typically may be of carbide, molybdenum, tungsten, tantalum or ceramics, all of which are strong absorbers. Where the tool surface is treated, the absorbtion may be enhanced by application of paints, surface oxidation such as anodising by treatment with an excimer laser as shown in U.S. Pat. No. 4,857,699 or other suitable treatment. Typically, surfaces with absorbtion coefficients, $\epsilon$, equal to or greater than 0.2 have been found satisfactory. Where surface treatments are utilised, the material of the tool 28 need not exhibit the strong absorption but a material with appropriate melting point and thermal conductivity should be used.

The barrel 26 is connected at one end to an insulating disk 40 which in turn connected to support in the form of an armature 42 of the translation device. At the opposite end, the tip 30 is conical with an end surface 44 providing a contact area for impingement with the workpiece 10. The end surface 44 is dimensioned so as to provide an area which is smaller than $\lambda^2$ where $\lambda$ is the wavelength of the incident laser beam.

In operation, the workpiece 10 is positioned so that the tool 28 is located adjacent to but not in contact with the seam 16. The controlling unit 36 activates the laser unit 20 so that a beam of coherent energy indicated at 50 is reflected by reflector 22 and focused by lens 24 to impinge upon the absorption zone 25 of surface 38 of barrel 26. The surface treatment of surface 38 enhances the coupling of the beam 50 to the barrel 26 to elevate the temperature of the tip 30 above the melting point of the workpiece 10.

Once the tip 30 has attained the requisite temperature, the surface 44 is brought into contact with the workpiece 10 and energy is transferred to melt the abutting edges of the components 14,16. With the weld initiated, the tool 28 is retracted from physical contact but maintained adjacent to the workpiece 10 as it is moved along the axis 18 relative to the tool 28. Energy supplied to the tool by the beam 50 is transferred to the workpiece 10 to continue the weld along the seam 16.

Alternatively, the tool may be left in contact with the workpiece as it is moved along the seam 16 to transfer heat by contact as well as radiation.

By utilizing the intermediary of the tool 28, it is possible to optimize the absorption of the laser energy and transfer it to the workpiece 10 under optimum conditions. Heat transfer can be effected by conduction with direct contact with the workpiece and/or by radiation at wavelengths determined by the characteristics of the tool 28 and its temperature. Such radiation is chosen to be at wavelengths that are absorbed more efficiently than the incident laser radiation thereby enhancing the efficiency of the laser processing. The radiation emitted by the heated tool 28 is a broad band radiation where the peak wavelength of the radiation is determined by the temperature of the tool. The broadband radiation which is obtained in the above described manner is absorbed more efficiently by metal surfaces when compared to a single wavelength radiation available from infrared emitting lasers.

The characteristics of the tool 28 may be determined by a consideration of the thermal constants of its components. The thermal constants associated with the tool are its thermal conductivity K (J/gm °C.); thermal diffusivity $\chi$ ($cm^2$/sec); heat capacity C (J/gm °C.); density p ($gm/cm^3$;) and melting temperature $T_m$°C.

Examples of the tool are set out below with the following denotations to indicate the thermal constants of the components:

| Insulating Disc 40 | Barrel 26 | Tip 30 |
| --- | --- | --- |
| $K_1$ | $K_2$ | $K_5$ |
| $\chi^1$ | $\chi^2$ | $\chi^5$ |
| P1 | P2 | P5 |
| $T_{m1}$ | $T_{m2}$ | $T_{m5}$ |
| $C_1$ | $C_2$ | $C_5$ |

In a first example, the insulating disk 40 is made of fused quartz and the barrel 26 and tip 30 is formed of tungsten. The disk 40 has a radius R of 0.05 cm and a length X of 1 cm. Barrel 26 has a radius R of 0.05 cm and a length L of 1 cm. The length of the tip 40 is 0.1 cm. The thermal constants for these components are as follows:

| Insulating Disk 40 | Barrel 26, Tip 30 |
|---|---|
| $K_1 = 0.02$ | $K_2 = K_5 = 1.2$ |
| $\chi_1 = 0.006$ | $\chi_2 = \chi_5 = 0.56$ |
| $P1 = 2.2$ | $P2 = P5 = 19.3$ |
| $T_{m1} = 1600$ | $T_{m2} = T_{m5} = 3380$ |
| $C_1 = 1.0$ | $C_2 = C_2 = 0.15$ |

When laser radiation with power P is incident on the outer surface 38 of barrel 26, a fraction $\epsilon$ of this radiation will be absorbed at surface 38 and barrel 26. Typical values would be P=1 kw and $\epsilon$=0.2. If the power loss $P_L$ by conduction through the insulator 40 is much less than $\epsilon P$, then the temperature rise in the shaft will be approximately $$\Delta T = \frac{\epsilon P \Delta t}{\pi (0.05)^2 \times 1 \times 0.15 \times 19.3}$$

where $\Delta t$ is the duration of laser heating of the tool 28. Accordingly, $$\frac{\Delta T}{\Delta t} = 44 \epsilon P \ °C./sec,$$

with $\epsilon$=0.2 and P=1 kw $$\frac{\Delta T}{\Delta t} = 8.8 \times 10^3 \ °C./sec$$

A tool temperature of 2000° C. can then be produced with a pulse duration of $\Delta t$=0.23 sec. Conduction losses through the insulator will be approximately $$P_L = K_1 \frac{\pi R^2}{\chi} (2000 - T_o)$$

where $T_0$ is the ambient temperature.

With $T_0$=20° C., $P_L$=0.31 watt, which satisfies the criteria $P_L << \epsilon P$. The time scale for heat transfer from the barrel 26 to the end surface 44 of tip 40 is t $\cong 1^2/\chi_5 = 0.1^2/0.56 = 0.018$ sec. It is apparent that this time may be varied by changing the dimensions, composition and shape of the bit so as to optimize the effect of the tool 28 on the workpiece 10.

In a second embodiment of a tool 38 made from the same materials, the length $\chi$ of disc 40 is 1 cm and the length (L) of barrel 26 is 0.1 cm. Both have a radius of $1 \times 10^{-3}$ cm. The length of tip 30 is 0.01 cm.

Here $\Delta T/\Delta t=1.1 \times 10^6 \epsilon p$ (°C./sec). With $\epsilon$=0.2, P=1 kw, a shaft temperature of 2000° C. can be reached with a laser pulse duration $\Delta t=9.1 \times 10^{-6}$ sec. conduction losses through the insulator will be $P_L=1.2 \times 10_{-4}$ watts which satisfies the criterion $P_L << $ P. The time scale for heat transfer from the shaft to the tip of the tool bit is t=$(0.01)^2/0.56=1.8 \times 10^{-4}$ sec.

These examples indicate that heat may be transferred either continuously or in a pulsed or periodic manner from the tool to the workpiece. For continuous heating, the absorbed laser power $\epsilon$ will be adjusted to balance the heat transfer to the workpiece over the contact area $\pi r^2$ where r is the radius of the end surface 44. The tool 28 is particularly beneficial when used with materials that are highly reflective at the wavelength of the laser beam 50 and possibly also highly conductive. Such materials include aluminum alloys, copper, magnesium alloys, silver and gold whose absorption coefficients are in the order of 0.03. Of course, the tool 28 may be used with other materials such as steel but the absorbtion coefficients are comparable to those of the tool and so the immediate benefits are not realised.

Figure 3:
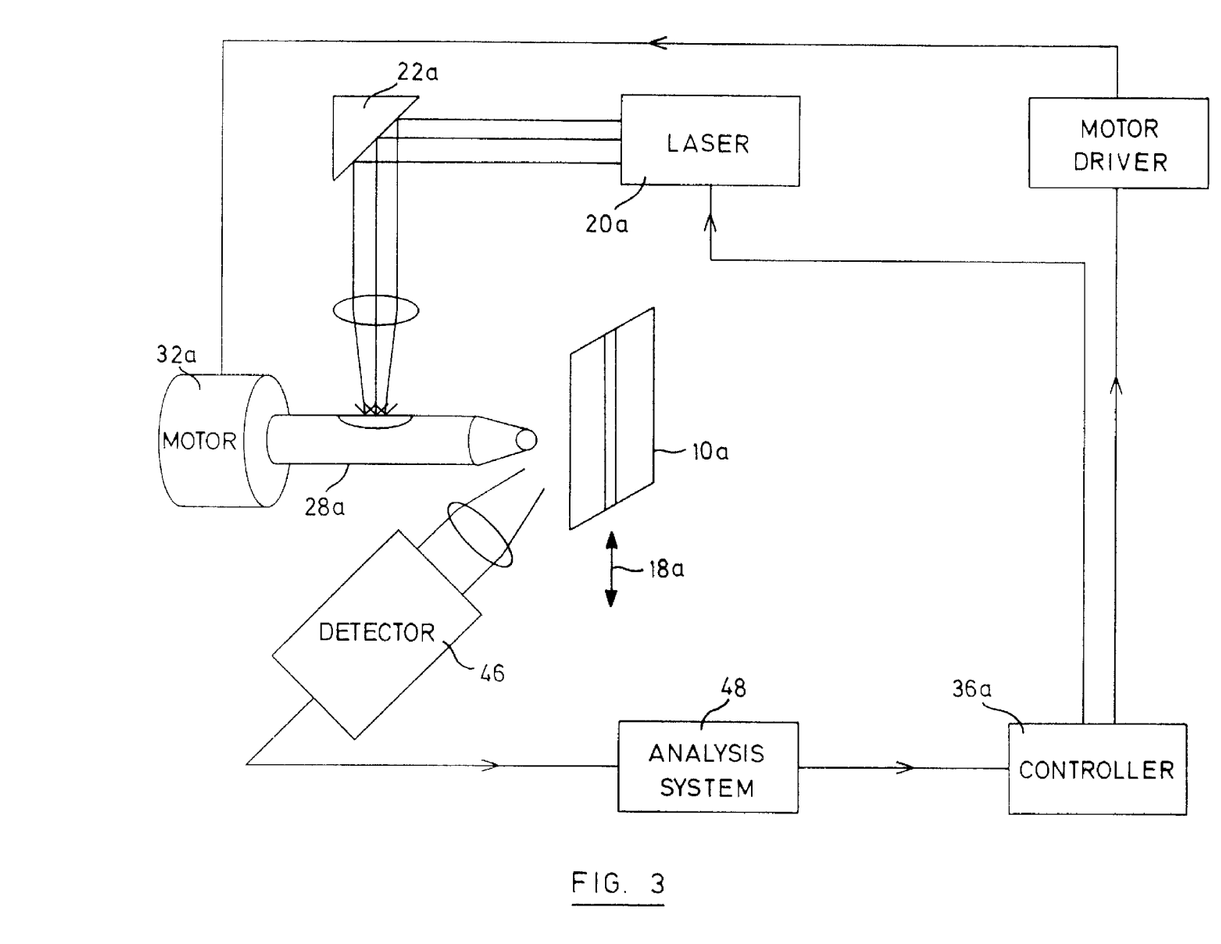
FIG. 3 is a schematic representation similar to FIG. 1 showing additional control functions for the apparatus of FIG. 1.

As shown in FIG. 3, in which like reference numerals denote like components with a suffix 'a' added for clarity, control of the heat transfer can be accomplished by monitoring the effect of the heated tool 28a at the workpiece 10a with a suitable detector 46 such as a thermocouple, photometer, pyrometer, or CCD camera. The signal derived from the detector 46 is used to control via a feedback system 48 and controller 36 the laser beam intensity on the tool barrel 26a, the position of the tool 28a on the surface of the workpiece 10a or the pressure of the tool 28a on the workpiece 10a. Such control may incorporate a fuzzy logic-neural net analysis system.

With pulsed heating of the tool 28, a pulse of heat can be transferred from the barrel 26 to the tip 30 and then from the tip 30 to the workpiece 10. The duration, amplitude and repetition rate of these pulses can be controlled by computer control of the laser 20. They may be sequenced with a mechanical motion of the tool 28. For example, the laser may be instructed to generate a single pulse which causes the barrel 26 to be heated. After some delay time which allows the heat generated in the barrel 26 to flow to the contact end of the tip 30, the tool 28 may be moved to contact the workpiece 10. In this way, a series or a way of discrete areas may be processed on the workpiece.

It will be seen, therefore, that initiation of processing is accomplished more efficiently with the use of the intermediate tool 28 than with direct impingement and obviates the need to pretreat the components to initiate the coupling.

Figure 4:
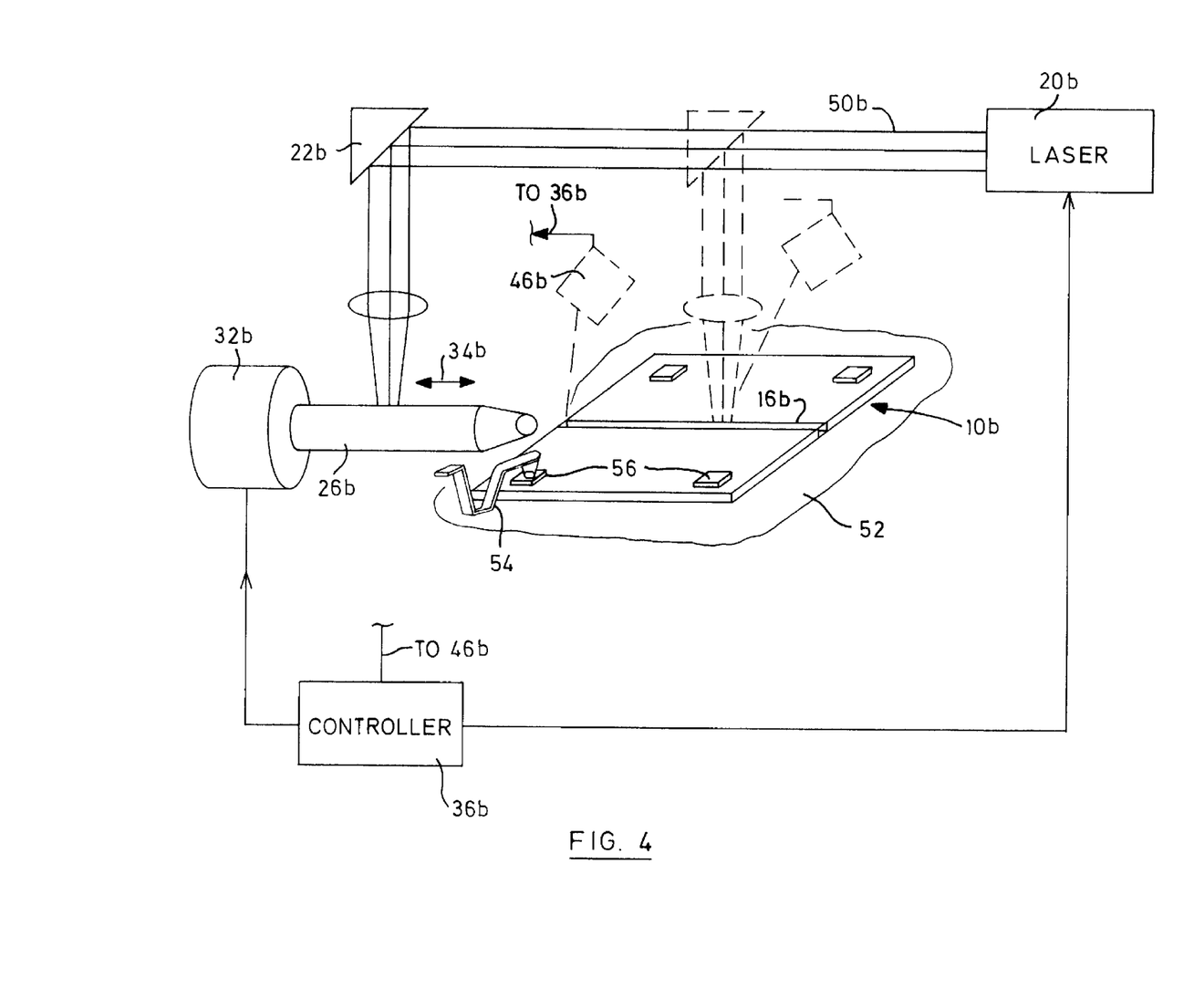
FIG. 4 is a schematic representation, similar to FIG. 1, showing an alternative arrangement of laser machining.
Figure 5:
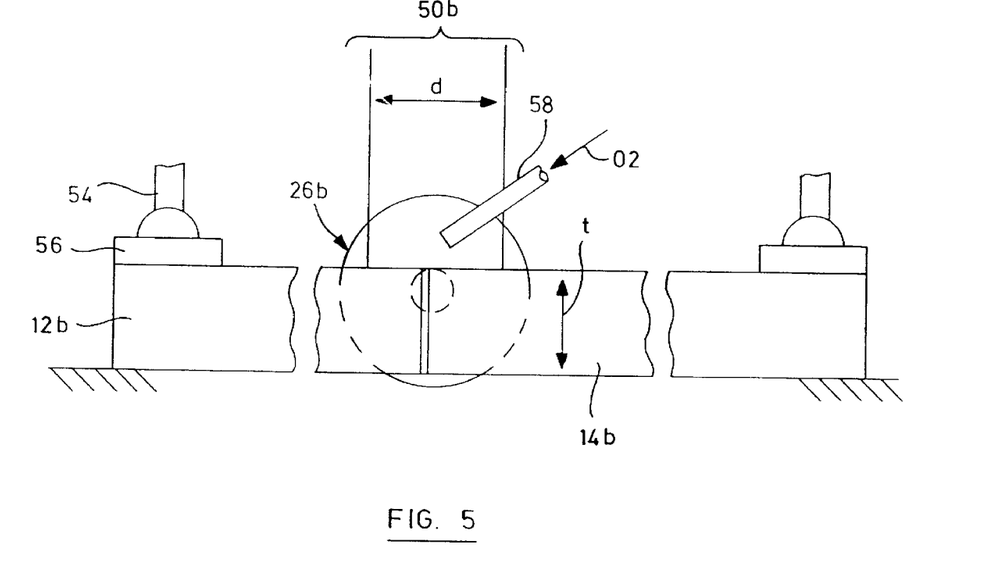
FIG. 5 is an end view of the representation of FIG. 3.

As described above, the tool 28 may be moved relative to the workpiece 10 to effect the welding. An alternative arrangement is shown in FIGS. 4 and 5 in which initial coupling of the laser beam to the workpiece is accomplished with a tool 28 as described above and subsequently the laser beam 50 is moved along the seam 16 independently of the tool 28. This arrangement will be further described below with like components denoted using like reference numerals with a suffix 'b' added for clarity.

Referring therefore to FIGS. 4 and 5, a $CO_2$ or other infrared laser source 20b delivers laser irradiation 50b to a workpiece 10b supported on a bed 52 of a 2 or 3 axis CNC motion system. A feedback sensor array 46b monitors processing variables, and returns information on the state, size and temperature of the weld pool. This information is received by the control computer 36b for real-time analysis, correction signals being generated by the computer 36b for control of the laser and/or motion system.

The workpiece 10b is retained on the bed 52 by clamps 54. A heating pad 56 is interposed between each clamp 54 and the respective one of the components 12b,14b and is supplied with electrical power to preheat the components 12b,14b.

A tool 26b is positioned adjacent one end of seam 16b and irradiated to attain a temperature above the melting point of the materials of the workpiece 10b. Tool 26b is then brought into contact with the components 12b,14b adjacent to the end of the seam 16b to initiate melting of the material.

The beam 50b is then moved from the tool 26b to the melted portion of the workpiece 10b. Because the workpiece 10 has been melted, initial coupling of the laser beam 50b is facilitated and further laser processing may be performed by scanning the beam 50 along the workpiece.

As noted above, the processing may include cutting, surface treatment or drilling of the workpiece 10b and the intensity of the beam 50b and its scan rate will be adjusted in accordance with known parameters.

The initial coupling achieved with the tool 26b is particularly beneficial when used to weld components 12b,14b along a seam 16b as shown in FIG. 4. The beam 50b is moved from the tool 26b to the seam 16b for a sufficient dwell time, $T_d$ (which is a function of the workpiece thickness and incident laser intensity), to form a massive amount of subsurface melting as indicated in FIG. 5. This melting occurs by conduction from the front i.e. laser irradiated surface being irradiated with the $CO_2$ laser. After melting occurs below the region melted by contact with the tool 26b, the tool 26b can be retracted and the laser beam 50b can be scanned along the seam 16b as indicated in ghosted outline. The scanning rate is determined so that the melting isotherm remains at the leading edge of the beam. This can be determined by the detector 46b that controls the scanning rate accordingly. During this scanning, sufficient coupling occurs through real-time oxidation of the irradiated surface to support a melting isotherm.

During this scanning, no shielding gases are required since an environment of ambient air is required to support real-time oxidation of the melting front. It has been found that improved welding performance may be obtained if the diameter of the incident beam 50b is equal to or greater than the minimum thickness of the material encountered during the welding. Thus, as shown in FIG. 5, beam 50b has a diameter 'd' greater than the thickness 't' of one of the components 12b, 14b. Where the components 12b, 14b are of unequal thickness, then the diameter 'd' should be equal to or greater than the thinner of the two components. Moreover, protection of the focusing optics is not required since the beam is defocused. However, it is contemplated that the oxygen content may be increased in the welding environment in certain applications where the materials permit by providing an enriched oxygen atmosphere through a supply nozzle 58. Heating pads 56 are used to regulate the rate of cooling of the workpieces to provide a crack-free weld. Typically, each pad may supply up to 2000 watts to the components.

This improved means of welding is not dependent upon initial coupling by tool 26b. Excimer laser (or any other UV laser) pre-treatment could be used or other means may be found (torch, plasma, coatings, etc.) that achieves the same effect, that is, to enable rapid and massive melting in the Al alloy. Once a means of establishing a melting isotherm has been created, the $CO_2$ laser beam geometry as described is capable of supporting it.

By reducing the initial reflectivity, the threshold intensity for the welding process is lowered. This enables the spot size of the $CO_2$ laser beam on the workpiece surface to be enlarged and by enlarging the incident spot size of the laser beam, more efficient heating of the workpiece occurs. Moreover, because the tool 26b absorbs the incident radiation more efficiently, it is not necessary to focus the incident beam on the tool 26b to get the desired effect and so the subsequent transfer of the beam to the workpiece is facilitated.

Plasma absorbtion, which is often responsible for limiting the power incident on an irradiated surface can also be mitigated as a result of the reduction of the intensity of the incident laser.

A solution of the one dimensional heat conduction equation, for the case of no internal sources of heat but with a flux of intensity I0 entering at Z=0 may be written in the form $$T(z, t) = \frac{\epsilon I_0 \chi t}{Kl} + \frac{\epsilon I_0 l}{K} \left[ \frac{3(l-z)^2 - l^2}{6l^2} - \right.$$

$$\left. \frac{2}{\pi} \sum_{n=1}^{\infty} \frac{(-1)^n}{n^2} e^{\frac{-\chi n^2 \pi^2 t}{l^2}} \cos\left(\frac{n\pi(l-z)}{l}\right) \right]$$

where $K$=Thermal conductivity (W/cm °C.)

$\chi$=Thermal diffusivity ($cm^2$/sec)

$\epsilon$=Absorptivity $I_0$=Incident intensity (W/$cm^2$)

t=Time (sec)

l=Workpiece thickness (cm)

Figure 6:
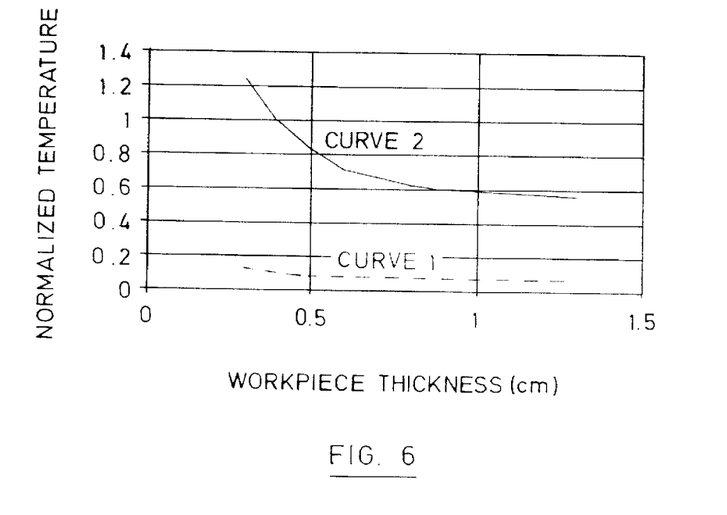
FIG. 6 is a set of curves showing the effect of enhanced coupling of the laser beams.

FIG. 6 shows two curves of theoretical data using equation 1 for the case of z=0 and dwell time, $t_d$=0.5 sec. Curves 1 and 2 both represent the temperature at the surface of material as a function of the sheet thickness. The incident intensity used for both curves is $I_0=7\times10^3$ W $cm^{-2}$ with a beam diameter of 0.32 cm. Temperature on the y axis has been normalized to an effective melting temperature, which takes into account the latent heat of fusion of the Al alloy. Curve 1 presents an aluminum surface which has been left untreated by any process (absorptivity, $\epsilon$=0.03). The plot shows that the high initial reflectivity inhibits any significant heating. Curve 2 shows data for an Al surface which has been pre-treated to increase the initial absorptivity to $\epsilon$=0.3. This theoretical curve supports experimental evidence that Al surfaces can melt for thicknesses close to 0.3 cm at $I_0=7\times10^3$ W $cm^{-2}$ when using a beam diameter of 0.32 cm, providing initial coupling is enhanced. Such coupling may be enhanced by pretreatment of the surface or by use of an intermediate tool 28 as described above.

Figure 7:
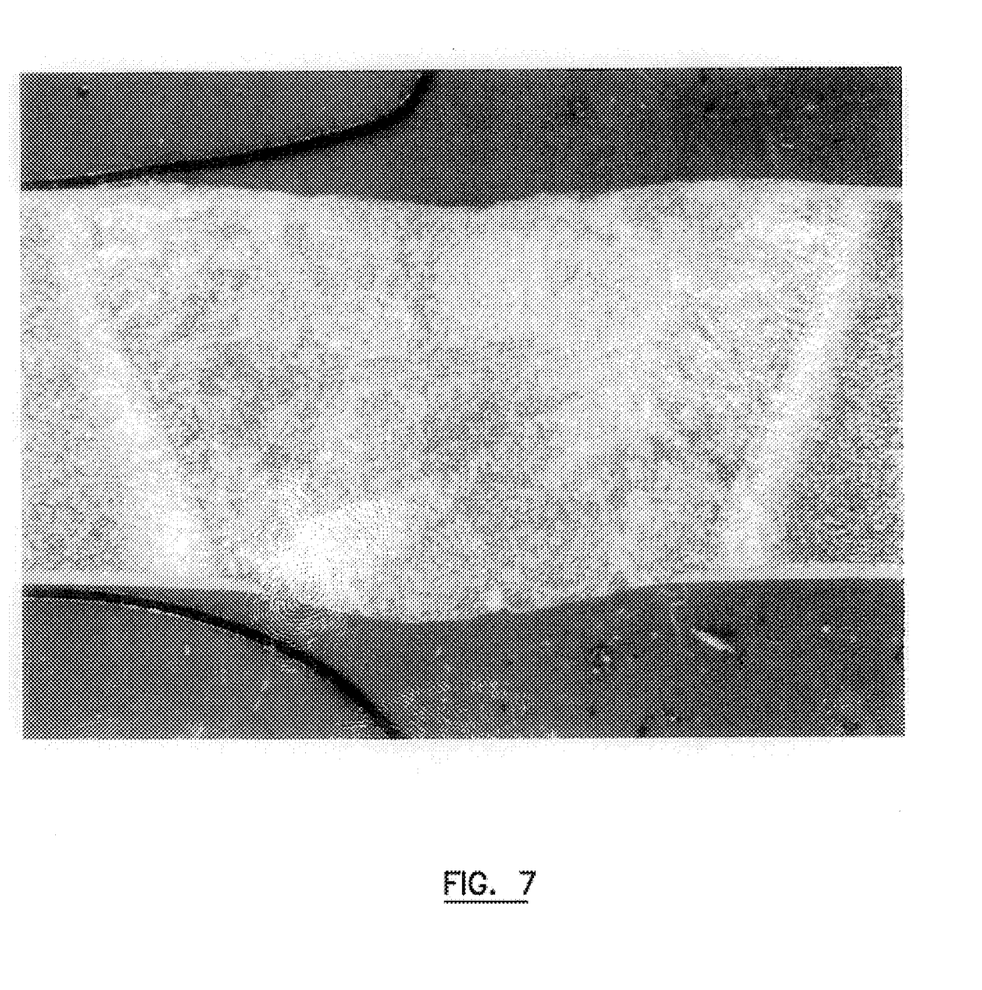
FIG. 7 is a microphotograph of a weld completed with the apparatus of FIG. 4.
Figure 8:
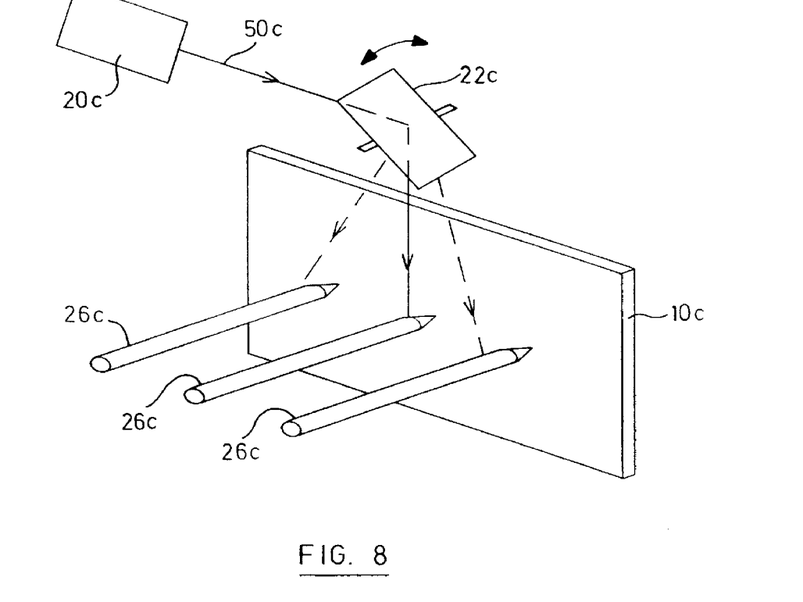
FIG. 8 is a schematic representation of an apparatus to perform processing at multiple locations.

FIG. 7 shows an optical micrograph of a cross-section view of two 3 mm thick Al 7075 T6 plates successfully butt welded according to the principles described above. The welding speed was 2.5 mm $sec^{-1}$ and the incident lasing power was 1450 Watts. The micrograph clearly shows evidence of a massive conduction limited weld which has been previously unattainable in Al alloys. A melting efficiency, $\eta$ factor which ratios the energy required to melt the metal to the energy incident from the laser beam can be written as $$\eta = \frac{bv\rho(C\Delta T + \Delta H)}{P}$$

where b=melting cross-sectional area ($cm^2$)

v=welding speed (cm/sec)

p=$CO_2$ laser power (W)

$\Delta H$=latent heat of fusion $\rho$=density (gm/$cm^3$)

The weld shown in FIG. 7 indicates a welding efficiency of approximately 0.11.

Table A below shows measured tensile strength and primary experimental parameters of welded Al 7075 using the increased diameter beam and the enhanced initial coupling described above. The samples had a thickness of 3 mm and a beam diameter of 3.2 mm.

| CO2 Laser Power (W) | Dwell time $T_d$ (sec) | Welding Speed (mm/sec) | Tensile Strength (MPa) |
|---|---|---|---|
| 1423 | 2 | 2.2 | 282 |
| 1428 | 2 | 2.35 | 289 |

-continued

| CO2 Laser Power (W) | Dwell time T_d (sec) | Welding Speed (mm/sec) | Tensile Strength (MPa) |
|---|---|---|---|
| 1421 | 2.5 | 2.2 | 300 |
| 1434 | 3 | 2.35 | 300 |
| 1544 | 3.5 | 2.54 | 330 |

Moreover, it is found that the alloy composition is not affected significantly through the weldment and the heat affected zone.

In a further test, two samples of Al 5754 were used, one of 2 mm thickness and the other of 0.8 mm thickness. The samples were welded edge to edge using a $CO_2$ laser power of 2600 W and an oxygen enriched atmosphere. The dwell time $T_d$ was 100 msec. and a weld speed of 2540 mm/sec. was attained. The tensile strength of the weld was greater than that of the 0.8 mm sample material. The significant decrease in dwell time may be attributed to the decreased thickness of one of the samples and the increased weld speed attributed also to the oxygen enriched atmosphere possible with Al 5754. Oxygen could not be used with Al 7075 because of the zinc content present in that alloy.

This improved means of welding is not specific to the $CO_2$ laser. Other laser sources such as the YAG laser, emitting at a wavelength of 1.06 μm, or lasers emitting at other wavelengths (CO lasers) in the infrared can be utilized.

Although described for use with 7000 series alloys, the process may be used on other materials exhibiting similar properties. For example, it is contemplated that the principles disclosed herein may be used for welding of other materials such as aluminum based metal matrix composites (e.g. Al with embedded alumina particles). The new welding geometry and practice can also be applied to other difficult-to-weld Al alloys such as 5000 and 6000 series alloys as well as the highly reflective materials noted above.

In summary, therefore, the irradiation of the tool 26b enhances initial melting of the material to be processed that facilitates further coupling of the beam 50b to the material. Further processing may then be carried out by scanning the beam across the workpiece. Welding may be effected by utilizing a beam diameter of diameter greater than the thickness of the material.

Figure 9:
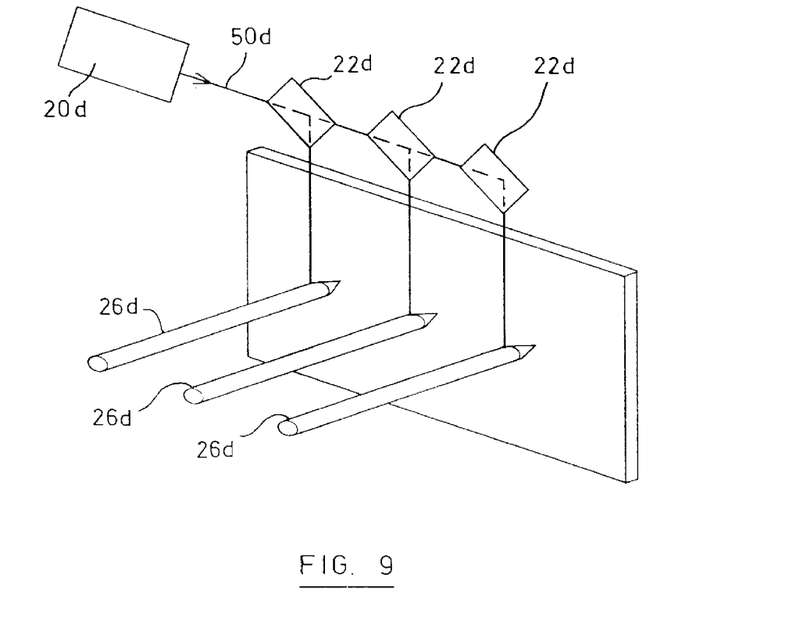
FIG. 9 is a schematic representation of an alternative apparatus to that shown in FIG. 8.

The embodiments described above show a processing operation in a single location on a workpiece. In certain applications, treatment may be required at multiple locations. Rather than move the tool between locations, an alternative approach is to construct a tool with more than one shaft/bit combination as shown in FIG. 9 where a suffix 'c' is added for clarity. The laser 20c can then be time shared between these shaft/bit 26c combinations by scanning or stepping the reflector 22c to deflect the beam 50c while pulsing or chopping the laser beam. In this way, a variety of designate spots on the workpiece 10c may be treated without moving the tool.

A further alternative as shown in FIG. 10 with a suffix 'd' would involve optically multiplexing the laser beam 50a between two or more shaft/bit combinations so as to simultaneously treat two or more spots on the workpiece.

As a further alternative, a single motor/shaft combination can be moved from one tool bit to another at spaced locations with an accompanying scanning of the laser so that the shaft is heated by the laser when the shaft is in contact with each tool bit.

We claim:

1. A method of transferring energy from a laser beam to workpiece for laser processing comprising the steps of irradiating a tool with a laser beam to elevate the temperature thereof positioning said tool adjacent to said workpiece to transfer energy thereto and transferring said beam from said tool to said workpiece after initial transfer of energy from the tool to heat the workpiece and upon attainment of a predetermined physical condition of said workpiece.

2. A method according to claim 1 wherein said tool contacts said workpiece to transfer energy thereto.

3. A method according to claim 1 wherein said beam impinges said workpiece at a diameter equal to or greater than the minimum thickness of the workpiece encountered during laser processing.

4. A method according to claim 3 wherein an oxygen enriched atmosphere is provided adjacent to the impingement of said beam on said workpiece.

5. A method according to claim 1 wherein at least a portion of said tool is treated to enhance absorption of said laser radiation.

6. A method of transferring energy from a laser beam to a workpiece for laser processing comprising the step of providing an absorption zone on an exterior surface of a tool to enhance absorption of said laser, irradiating said zone with said laser beam to elevate the temperature thereof, positioning said tool adjacent said workpiece to transfer energy thereto to heat the workpiece and translating said tool relative to said workpiece to perform said processing.

7. A method according to claim 6 wherein said tool contacts said workpiece to transfer energy thereto.

8. A method according to claim 6 wherein said tool is maintained spaced from said workpiece during translation.

9. A method of laser welding a seam formed by adjacent surfaces of a pair of workpieces comprising the steps of coupling a beam to at least one of said workpieces positioning said beam to impinge upon said seam and continuing to irradiate said workpiece with a beam of incident radiation having a diameter at impingement of said seam greater than or equal to the minimum thickness of the workpieces encountered during processing, said beam melting said adjacent surfaces to produce a welded seam upon cooling thereof.

10. A method laser welding according to claim 9 wherein said beam is translated relative to said workpiece to perform said welding.

11. A method according to claim 9 wherein said step of coupling comprises irradiating a tool positioned adjacent to said workpiece, said beam elevating the temperature of the tool to transfer energy to said workpiece.

12. A method according to claim 9 wherein an oxygen enriched atmosphere is provided around said beam as it impinges on said workpiece.

13. A method according to claim 9 wherein heat is supplied to said workpiece after processing to retard cooling thereof.

14. A laser welding apparatus to weld a seam formed by adjacent surfaces of a pair of workpieces, said apparatus comprising a source of laser radiation to generate a beam of coherent radiation, and a tool having an outer surface to be impinged by said beam of radiation and be heated thereby, said tool being positioned adjacent one of said workpieces to transfer energy thereto, said beam being moveable relative to said workpiece and said tool to transfer along said seam and effect welding thereof by melting said adjacent surfaces.

15. Apparatus according to claim 14 wherein at least a portion of said outer surface of said tool is treated to enhance absorption.

16. Apparatus according to claim 15 wherein at least said portion has a coefficient of absorption equal to or greater than 0.2 at the wavelength of said beam.

17. Apparatus according to claim 16 wherein absorption of said outer surface is enhanced by application of at least one of the group consisting of paints, surface oxidation and application of a laser of different wavelength.

18. Apparatus according to claim 14 wherein said tool is formed from a material selected from the group carbide, molybdenum tungsten, tantalum and ceramics.

19. Apparatus according to claim 14 wherein said tool is connected to a support and an insulator is interposed between said support and tool to inhibit heat transfer therebetween.

20. Apparatus according to claim 19 wherein said tool includes a barrel and a tip to be positioned adjacent to said workpiece, said tip being of reduced cross-section to said barrel.

21. Apparatus according to claim 20 wherein said tip is conical.

* * * * *